Patented Mar. 11, 1941

2,234,743

UNITED STATES PATENT OFFICE 2,234,743

VULCANIZATION

David Spence, Monterey, Calif., assignor to The B. F. Goodrich Company, New York, N. Y., a corporation of New York No Drawing. Application November 11, 1936, Serial No. 110,305

15 Claims. (Cl. 260—773)

This invention relates to the art of rubber manufacture and has as its chief object to provide a new method for the vulcanization of rubber.

The vulcanization of rubber has been carried out for almost a century by the original method discovered by Goodyear, of heating the rubber with sulphur, and while great improvements have been made in the art, the process still remains fundamentally unchanged, and the presence and addition to rubber of sulphur or its equivalent in one form or another is still generally regarded as essential to vulcanization. It is interesting to note that Goodyear in his book on "Gum elastic" (1855, pp. 73 and 164) points out that this vulcanization of rubber in the presence of sulphur can be brought about by the influence of the sun's rays and that "solarization" with sulphur was actually practiced in the treatment of rubberized fabrics at that time. This vulcanization of rubber by means of light has since been studied by various investigators, but always along Goodyear's original lines, employing sulphur as the essential element in the vulcanizing process. These studies have been made for the most part by exposing solutions of rubber in solvents to artificial illumination in presence of sulphur. On account of the practical difficulties involved and the comparatively poor results obtained by these means, the vulcanization of rubber by sulphur in this way has remained where it was when Chas. Goodyear first drew attention to it in 1855.

It has now been discovered that an effective vulcanization of rubber is rapidly brought about by the action of actinic light in the presence of light-activated agents and in the complete absence of conventional vulcanizing agents such as sulphur and sulphides. This result is all the more surprising and novel because of the well known deteriorating influence of light on rubber, particularly in presence of air. My results have established, however, that the presence of less than one percent of a powerful light-activated substance is sufficient to bring about a rapid vulcanization of the rubber by light, even in presence of air. Nevertheless, it is often desirable to exclude air, that is, free oxygen, from the rubber during the exposure to light.

Of all the substances which have so far been examined in this connection, those having the typical quinoid structure A=R=B where R is an aromatic nucleus appear to be the most effective. These quinoid substances are well known to be activated by light, but there is a wide range of light-activated agents which may also be employed in this connection with more or less success, and the invention consists broadly in vulcanization of rubber by light in presence of light-activated agents. The vulcanization of rubber by this means may be carried out by exposing thin sheets of rubber to the action of sunlight in the presence of the light-activated agent. As a practical matter, it is preferred to carry out this vulcanization while the rubber is still in the latex form and the latex containing the light-activated agent may be shaken or circulated as a fine stream or spray in presence of the source of light. Ordinary sunlight may be used or the rubber or latex may be exposed to any sufficiently powerful source of artificial illumination, ultra-violet illumination appearing to be the most powerful. The casual illumination by artificial light or weak diffuse light to which rubber is exposed in ordinary manufacturing operations appears to be insufficient to bring about a significant change in a practical time with any of the light-activated agents thus far studied.

In carrying out the process with latex the best results are attained when the latex is substantially neutral in reaction, (as determined by pH measurement) and the presence of an excess of alkali, as in the case of ammonia-preserved latex, may more or less completely destroy the effect. Similarly, it has been found that certain substances present in the serum of natural latex may tend to reduce the effect or to increase the amount of agent required to bring about any desired result. It is preferred to employ latex from which these serum constituents have been largely removed by centrifuging or by dialysis and to stabilize the latex against possible coagulation during treatment by adding thereto and in addition to the light-activated agent a suitable neutral buffer solution (preferably M/20 sodium phosphate buffer having a pH of substantially 7). While some light-activated agents are more sensitive to the presence of alkali than others, they appear generally to be most effective in a nearly neutral medium.

The results produced in the vulcanization of rubber or latex in this way depend on the character and quantity of the light-activated agent present, on the time of exposure and on the intensity of the light source to the surface exposed. Thus, the thickness of the rubber or the concentration of the latex will affect the degree of conversion of the rubber with any given agent in a given time and similarly the presence of substances which tend to destroy the light-activated agent or to lessen the effectiveness of the active light in bringing about this vulcanization should be avoided. Thus, if the light-activated agent is itself readily oxidized in presence of air, it may be necessary to carry out the illumination in the absence of air, for certain substances which act as powerful light-activated agents in complete absence of air, actually bring about a breaking down of the rubber if air is present. Such substances are themselves usually more or less unstable in the presence of air, particularly in alkaline solutions.

In carrying out the precess with latex, concentrations varying from 5 to 40% or more of rubber may be used, and concentrations of light-activated agents varying from one tenth of one percent to ten percent more or less, depending on the strength of the agent and the result desired. In this way and by varying the time of exposure to any given source of light, it has been found that the characteristics of the rubber may be varied at will, with the production of products ranging in physical character from semi-vulcanized to full vulcanized rubbers. Thus, with increasing amounts of light-activated agents or increasing times of exposure products showing less and less of the physical characteristics of raw rubber and more and more of the properties of a vulcanized rubber are obtained until finally a product is produced which in physical character and behaviour toward solvents for rubber, resembles a fully vulcanized rubber. Thus, products which swell in solvents for raw rubber and dissolve more or less completely therein, are gradually converted by these means into products which are practically completely insoluble in these same solvents, swelling only very slightly therein. In this respect it has been possible to plot curves of the reaction of the same general character as vulcanization curves of rubber with small amounts of sulphur. By suitable choice of the light-activated agent to begin with, and adjustment of the amount of same, and of the conditions of exposure to the source of light products of definite degrees of conversion are obtained.

The more powerful the light-activated agent employed, the more quickly the physical results of a vulcanization become evident and by suitable choice of reagent and in the amount thereof, the time required for vulcanization may be varied from hours to minutes.

As examples of how the process may be carried out the following may be cited:

(a) A neutral latex containing 40% rubber, prepared from commercial 60% latex concentrate by replacement of the ammonia therein by dialysis into neutral buffer solution, was agitated for 4 hours in bright sunlight in presence of 1% of ordinary benzoquinone, the latex thereafter being poured on a porous tile to coagulate. The resulting products was a tough, elastic, transparent brown sheet, practically insoluble in benzol in 14 days, and having a swelling index (that is, the ratio of the final swollen volume in cubic centimeters of the portion remaining insoluble after 14 days immersion in benzol, to the original weight in grams of the sample) of 18 as compared with 110 for the untreated product of this latex.

(b) A similar result was obtained when this same latex with the benzoquinone added was first spread as a thin layer on the tile to coagulate and then exposed to light for 3 hours.

(c) A neutral buffered latex containing 20% of rubber was exposed to sunlight in tilting glass tubes for 2 and 3 hours in presence of 1% of 1,4 naphthoquinone. In 2 hours time the rubber was converted into a tough, elastic product, practically insoluble in benzol and swelling but slightly therein. The product exposed for 3 hours showed very little difference in properties.

(d) A 20% neutral, buffered latex prepared from 60% latex concentrate was exposed to 4 hours of bright sunlight with 0.2, 0.4, and 0.75% of 1,4 naphthoquinone present. With only 0.2% of naphthoquinone to the rubber, the product of this latex was only partially vulcanized and with the largest amount the optimum point of conversion after 4 hours of exposure seemed to have been exceeded.

(e) A similar 30% neutral, buffered latex, prepared from commercial 60% ammonia-preserved latex by dialysis against M/20 neutral phosphate buffer was exposed to sunlight as thin films on tiles for 2½ hours in presence of varying proportions up to 1% of 1,4 naphthoquinone. The effect of this 2½ hours exposure with only 0.05% of naphthoquinone present to the rubber was clearly evident in the physical character of the resulting product and with 0.25% or more the product in physical character resembled vulcanized rubber. It was practically insoluble in benzol in 14 days and showed a swelling index of 16 as compared with 113 for the untreated control sample.

(f) Similar results have been attained in 30 min. by exposing 30% dialysed latex in neutral condition to a mercury vapor arc in tilting quartz tubes in the presence of 0.4% of 1,4 naphthoquinone.

(g) A quantity of very thin pale crepe, dried in vacuo, was exposed to the vapor of quinone in the absence of air and in the dark, then placed in sunlight for 2 hours. Whereas the unexposed crepe was only 35% insoluble in benzol, with a swelling index of 107, the light-exposed material was rendered 88% insoluble in benzol and has a swelling index of only 14, under similar test conditions.

(h) A quantity of neutral latex, prepared from 60% latex concentrate by dialysis against M/20 neutral phosphate buffer solution until all ammonia was removed had added to it 5% of quinone (on the rubber) first dissolved in warm alcohol and diluted with water before adding to the latex. Samples of this latex were then exposed for 5 hours to diffuse sunlight in presence of air, also in nitrogen, at temperatures of 20° and 90° C. in each case. The latices were then coagulated by acid and the products washed, extracted with acetone and dried all in the dark room. The results are shown in the following table:

|  | Rubber insoluble in 14 days | Swelling index |
|---|---|---|
|  | Percent |  |
| Control (untreated) | 38 | 105 |
| In N₂ at 20° C | 55 | 65 |
| In N₂ at 90° C | 83 | 22 |
| In air at 20° C | 50 | 64 |
| In air at 90° C | 22 | Unlimited |

This test clearly shows that at normal temperatures the presence of air makes no appreciable difference in the results obtained by light activated quinone and that at higher temperatures (90° C.) in absence of air still better results may be obtained. In the presence of air at the higher temperatures the rubber on the other hand was actually broken down to a soluble form by the action of the light in presence of quinone.

(j) A quantity of neutral latex (prepared by the addition of M/20 neutral phosphate buffer to fresh latex in the Far East subsequently sterilized and shipped in sealed container) was mixed with 1% of 1,4 naphthoquinone on the rubber. The naphthoquinone was dissolved in alcohol by heating, an equal volume of water being added before mixing with the latex. This latex was exposed to sunlight in a long glass tube supported horizontally on a rocking table and samples were withdrawn at various periods of time and allowed to coagulate on individual porous tiles. The physical properties of these various products were measured in the usual way. The results will be seen in the following table:

|  | Un-treated control | Light exposed | | | | | |
| --- | --- | --- | --- | --- | --- | --- | --- |
|  |  | 2 hrs. | 3 hrs. | 4 hrs. | 5 hrs. | 6 hrs. | 10 hrs. |
| Tensile at break, lbs. per sq. inch | 393 | 571 | 1103 | 1106 | 1532 | 1892 | 2225 |
| Elongation | 1075 | 1020 | 1065 | 1015 | 1050 | 1045 | 1060 |

The conversion of raw rubber into products having the physical character of a vulcanized rubber has been similarly brought about by a wide range of substances activated by light, and by the choice of the light-activated agent employed and appropriate adjustment of conditions, results of any desired character can be obtained. Thus, it has been found that other quinones such as 1,2 naphthoquinone and tolu-p-quinone and derivatives of quinones such as tetrachlor-quinone, as well as light-activated agents other than quinones, such as benzophenone, may be employed to bring about this remarkable transformation in the physical character of the rubber resulting from the exposure of a neutral latex to sunlight in the presence of these reagents. Similarly other light-activated agents, more or less ineffective in presence of air, may be used to bring about this vulcanization of the rubber hydrocarbon if the latex is exposed to light in sealed containers in absence of air. Thus, anthraquinone and phenanthraquinone which are less effective in presence of air are rendered active when air is excluded. Similarly, other well known light-activated substances may be employed if air is excluded. For example, by exposing a 15% neutral buffered latex to the action of sunlight for 4 hours in presence of 5% of benzaldehyde in sealed containers from which the air has been removed and replaced by nitrogen, the rubber is converted into a snow white product, tough and elastic, and quite insoluble in benzol, swelling in the same to some extent, and resembling a well vulcanized rubber.

Furthermore, in order to demonstrate the underlying principle of this invention, para-phenylene diamine has been converted to the corresponding quinone di-imide, also the dichlorodiimide, in both of which, it will be noted, the oxygen of ordinary benzoquinone is completely replaced, and these substances have been tested for their effect both on latex and rubber exposed to sunlight. Whereas the para-phenylene diamine itself is without effect when neutral latex is exposed to light in its presence and in complete absence of oxygen, the di-imides on the other hand bring about a rapid, complete conversion of the rubber under similar conditions into products which are short and tough and quite insoluble in benzol and practically unaffected by it. On account of the extreme sensitivity of these di-imides to oxygen, it is necessary, particularly in the case of quinone di-imide to operate in complete exclusion of air if maximum results are to be attained and the effects of oxidation avoided.

From these and other results it is believed that the mechanism of the action of these light activated agents in accelerating and bringing about these remarkable physical transformations in rubber by the action of light, is one of dehydrogenation and can be so interpreted. In any event by the action of light assisted by these means, the rubber of latex may be rapidly converted into a product having all the characteristic properties of a vulcanized rubber. The latex after treatment in outward appearance and in general chemical properties is substantially unchanged, and the age-resisting properties of the products resulting from such treatment may be actually improved as the result of the production of valuable antioxidants as final products of the (dehydrogenating) process. Thus, the quinones when present in small amount may be completely reduced to the corresponding hydroquinones which are well known for their preservative effect when present in rubber. Additional antioxidants may be added to the latex before or after treatment if desired.

By the means described, conversion products of natural rubber as such or of latex may be readily produced for any required purpose and the process is not limited to products of complete vulcanization. A wide range of physical properties can be obtained and by the well known methods of organic chemistry and further study, improved results and products will undoubtedly be developed. A very important factor is that it is possible to avoid completely the use of heat with its depolymerizing effect on rubber, and of sulphur and sulphides in the preparation of these products, and the advantages which result therefrom in overcoming the well known objections to the presence of sulphur and sulphur-containing compounds where vulcanized rubber is employed for certain purposes may well be pointed out. On the other hand we have found that these conversion products of natural rubber or of latex may be mixed with sulphur and the other well known compounding materials and subjected to additional vulcanization in the ordinary way.

Although the invention has been described in considerable detail with reference to certain preferred procedures and materials, it is to be understood that numerous modifications and variations therein may be made by the skilled artisan without departing from the spirit and scope of the invention and defined in the appended claims.

I claim:

1. The method of vulcanizing rubber which comprises exposing substantially unvulcanized rubber to actinic light of an intensity at least comparable to direct sunlight in the absence of sulphur and sulphides and in the presence of a dehydrogenating agent having a quinoid structure which is activated by light.

2. The method of vulcanizing rubber which comprises preparing a mixture of solid rubber with a dehydrogenating agent having a quinoid structure and which is activated by light, and exposing the admixture in the absence of sulphur and sulphides to the action of actinic light of an intensity at least comparable to direct sunlight.

3. The method of vulcanizing rubber which comprises preparing a mixture of solid rubber with 1,4 naphthoquinone and exposing the admixture in the absence of sulphur and sulphides to the action of actinic light of an intensity at least comparable to direct sunlight.

4. The method of treating latex or analogous aqueous dispersions of substantially unvulcanized rubber, which comprises admixing with the latex a light-activated dehydrogenating agent having a quinoid structure, and subjecting the admixture in the absence of sulphur and sulphides to the action of actinic light of an intensity at least comparable to direct sunlight.

5. The method of treating latex or analogous aqueous dispersions of substantially unvulcanized rubber, which comprises admixing with the latex a light-activated dehydrogenating agent having a quinoid structure, and subjecting the admixture, in the substantial absence of oxygen, sulphur and sulphides, to the action of actinic light of an intensity at least comparable to direct sunlight.

6. The method of treating latex or analogous aqueous dispersions of substantially unvulcanized rubber, which comprises admixing with the latex a para quinone, and subjecting the admixture in the absence of sulphur and sulphides to the action of actinic light of an intensity at least comparable to direct sunlight.

7. The method of treating latex or analogous aqueous dispersions of substantally unvulcanized rubber, which comprises adding to substantially neutral buffered latex a reagent having a quinoid structure and which is activated by light, and exposing the so treated latex in the absence of sulphur and sulphides to the action of actinic light of an intensity at least comparable to direct sunlight.

8. The method of treating latex or analogous aqueous dispersions of substantially unvulcanized rubber, which comprises adding 1,4 naphthoquinone to substantially neutral buffered latex and subjecting the so treated latex in the absence of sulphur and sulphides to the action of actinic light of an intensity at least comparable to direct sunlight.

9. Rubber having at least some of the physical properties of vulcanized rubber which has been prepared according to the process of claim 2.

10. An aqueous dispersion of rubber having the physical properties of vulcanized rubber which has been prepared according to the process of claim 6.

11. The method of vulcanizing rubber which comprises exposing substantially unvulcanized rubber to actinic light of an intensity at least comparable to direct sunlight in the absence of sulphur and sulphides and in the presence of a compound having the structure $O=R=O$ where R is a quinoid hydrocarbon group.

12. The method of vulcanizing rubber which comprises exposing substantially unvulcanized rubber to actinic light of an intensity at least comparable to direct sunlight in the absence of sulphur and sulphides and in the presence of a naphthoquinone.

13. The method of treating latex or analogous aqueous dispersions of substantially unvulcanized rubber which comprises admixing with the latex a compound having the structure $O=R=O$ where R is a quinoid hydrocarbon group and exposing the mixture in the absence of sulphur and sulphides to the action of actinic light of an intensity at least comparable to direct sunlight.

14. Rubber which has been vulcanized by irradiation in the absence of sulphur and sulphides and in the presence of a compound having the structure $O=R=O$ where R is a quinoid hydrocarbon group.

15. Rubber which has been vulcanized by irradiation in the absence of sulphur and sulphides and in the presence of 1,4 naphthoquinone.

DAVID SPENCE.